United States Patent [19]

Glatt

[11] 4,326,480
[45] Apr. 27, 1982

[54] ROTATABLE COATING VESSEL

[75] Inventor: Werner Glatt, Kreis Lörrach, Fed. Rep. of Germany

[73] Assignee: Werner Glatt GmbH, Binzen, Fed. Rep. of Germany

[21] Appl. No.: 188,700

[22] Filed: Sep. 19, 1980

[30] Foreign Application Priority Data

Sep. 25, 1979 [DE] Fed. Rep. of Germany ....... 2938795

[51] Int. Cl.³ .............................................. B05B 1/02
[52] U.S. Cl. ...................................... 118/50; 118/19; 118/20; 118/59; 118/303; 118/69; 118/326; 366/139
[58] Field of Search ...................... 118/19, 20, 24, 50, 118/418, 421, 303, 326, 58, 59, 69; 427/3, 212, 242, 231, 238; 366/139, 178, 220, 232, 233; 34/134, 146

[56] References Cited

U.S. PATENT DOCUMENTS

| | | | |
|---|---|---|---|
| 2,736,288 | 2/1956 | Clay et al. | 118/418 X |
| 3,911,860 | 10/1975 | Nohynek | 118/19 X |
| 4,118,522 | 10/1978 | Stellmach | 118/17 X |
| 4,186,782 | 2/1980 | Scharf | 118/17 X |

FOREIGN PATENT DOCUMENTS 2319960 11/1974 Fed. Rep. of Germany .

Primary Examiner—John D. Smith
Assistant Examiner—Bernard F. Plantz
Attorney, Agent, or Firm—Burns, Doane, Swecker & Mathis

[57] ABSTRACT

The present invention relates to a coating apparatus comprising a coating vessel rotatably supported at one end and connected to a vacuum source by a coaxially arranged and co-rotatable tube containing a spray nozzle. The tube is supported separately from the coating vessel and is arranged for movement along the axis of rotation of the coating vessel. The coating vessel includes a discharge opening closable by a cover which is carried by the tube. The tube is preferably guided for movement along the axis of the coating vessel within a piece of pipe which is rotatably supported within a bearing box which is pivotable away from the coating vessel.

8 Claims, 3 Drawing Figures

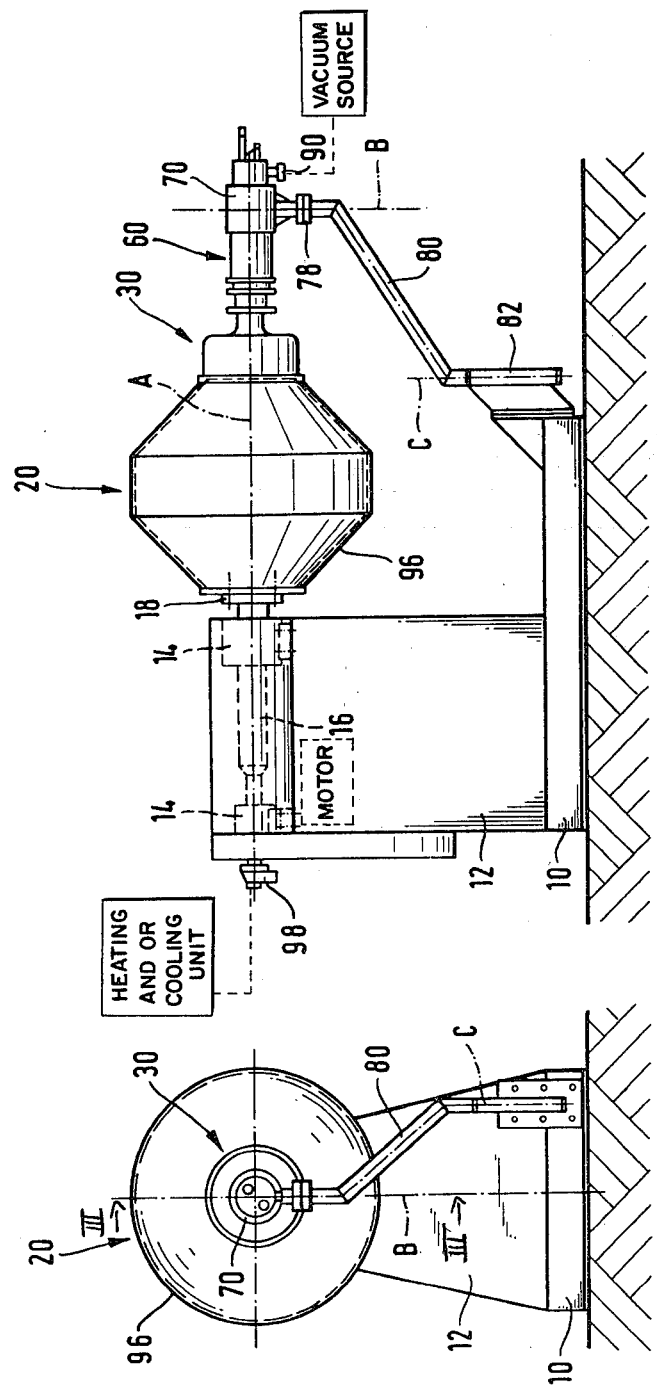

ROTATABLE COATING VESSEL

BACKGROUND AND SUMMARY OF THE PRESENT INVENTION

The present invention relates to a coating apparatus. More particularly, the present invention relates to an improvement in a coating apparatus of the type comprising a coating vessel rotatably supported at one end and connected to a vacuum source by a coaxially arranged and co-rotatable tube having a spray nozzle disposed at one end of a liquid conduit and a discharge opening closable by a cover arranged at an unsupported end of the discharge vessel.

A known coating apparatus of the above-mentioned type is disclosed in German DE-PS No. 2,319,960. A tube rotatable together with the coating vessel comprises a hollow shaft with the coating vessel being fixed at one end of the shaft. The hollow shaft extends through a bearing disposed directly adjacent the coating vessel and is connected with a drive unit at a side of the bearing remote from the coating vessel. The discharge opening is located axially opposite the hollow shaft and is closed by a cover which is carried exclusively by the coating vessel. It is customary for such covers to be connected with the coating vessel by hinges so as to be pivotable away from the coating vessel and, when in closed position, to be held in abutment against an edge of the discharge opening by a clamping device. A liquid conduit extends through the hollow shaft.

The discharge opening of this known coating apparatus is readily accessible since the coating vessel is supported at only the end remote from the discharge opening. However, the portion of the coating vessel which is adjacent the hollow shaft and the hollow shaft itself are not readily accessible for cleaning. This arrangement presents a disadvantage because, during coating, a generally sticky coating substance is sprayed into the coating vessel by the spray nozzle while the coating vessel is connected to a vacuum source through the hollow shaft. This arrangement provides the material to be coated, while being exposed to the spraying, with the best possible venting so that the material fully accepts the coating substance. With this procedure however, droplets of the coating substance suspended in the coating vessel, perhaps combined with dust particles of the material to be coated, are drawn by the vacuum into the area of the coating vessel which is connected to the hollow shaft and thus into the hollow shaft itself where the droplets of the coating substance form a firmly adhering coating on the hollow shaft.

Therefore, it is an object of the present invention to provide a coating apparatus of the above-described type which permits easier cleaning of both the coating vessel and the tube that is rotated together with the coating vessel.

This object and others are achieved in accordance with the present invention, by arranging the cover on the rotatable tube. In addition, the rotatable tube is supported separately from the coating vessel and guided for movement along the axis of rotation of the coating vessel.

In this way, the entire inner wall of the coating vessel, including the area remote from the cover for the discharge opening, may be smooth and is readily accessible through the discharge opening. Also, the tube which is rotatable together with the coating vessel and, in operation, connects the coating vessel with the vacuum source, is more accessible when the cover is removed than in the known coating apparatus. The reason for the improved accessibility is that the rotatable tube is arranged to move away from the coating vessel together with the cover so that the end of the rotatable tube which faces the coating vessel during operation is accessible directly rather than through only the coating vessel as in the known coating apparatus.

In a preferred embodiment of the present invention the rotatable tube is guided for axial movement by telescopic displacement within a rotatable piece of pipe which is supported by and sealed in a bearing box arranged to pivot away from the coating vessel. The distance over which the rotatable tube is axially displacable need only be sufficient so that the cover can be detached from the coating vessel without immediately affording full access to the discharge opening. The accessibility of the discharge opening as well as the inside of the cover is attained when the bearing box is pivoted away from the coating vessel together with the rotatable tube, the piece of pipe, and the cover.

The rotatable tube and the piece of pipe can be sealed directly with respect to each other by arranging one inside the other with a small clearance. However, it is preferred to provide sufficient radial clearance between the two so that any clamping or bending loads can be prevented in case the cover should take a somewhat eccentric position with respect to the axis of rotation when the coating vessel is closed. Therefore, in the preferred embodiment of the present invention the tube and the piece of pipe are tightly connected by a bellows. The bellows readily balances any axial misalignment between the tube and the piece of pipe.

Preferably, the bearing box is supported on a strut arranged for pivotal movement about a first pivot axis which intersects the axis of rotation of the coating vessel. The strut is pivotable about a second pivot axis which is spaced from and parallel to the first pivot axis. This arrangement can be produced at low cost and affords a particularly simple handling of the cover.

When the liquid conduit comprises a jet tube extending through the rotatable tube into the coating vessel, as is the case in the known coating apparatus described above, the jet tube of the coating apparatus according to the present invention preferably is fixed to the bearing box which is adapted to be swung away from the coating vessel. With this arrangement, the nozzle is also readily accessible for cleaning and replacement once the cover has been removed from the coating vessel.

BRIEF DESCRIPTION OF THE PREFERRED EMBODIMENT

A preferred embodiment of a coating apparatus according to the present invention will be described with reference to the accompanying drawings wherein like members bear like reference numerals and wherein:

FIG. 1 is a front elevational view of a coating apparatus according to the present invention;

FIG. 2 is a side elevational view of the coating apparatus according to the present invention.

DETAILED DESCRIPTION OF THE PREFERRED EMBODIMENT

Figure 3:
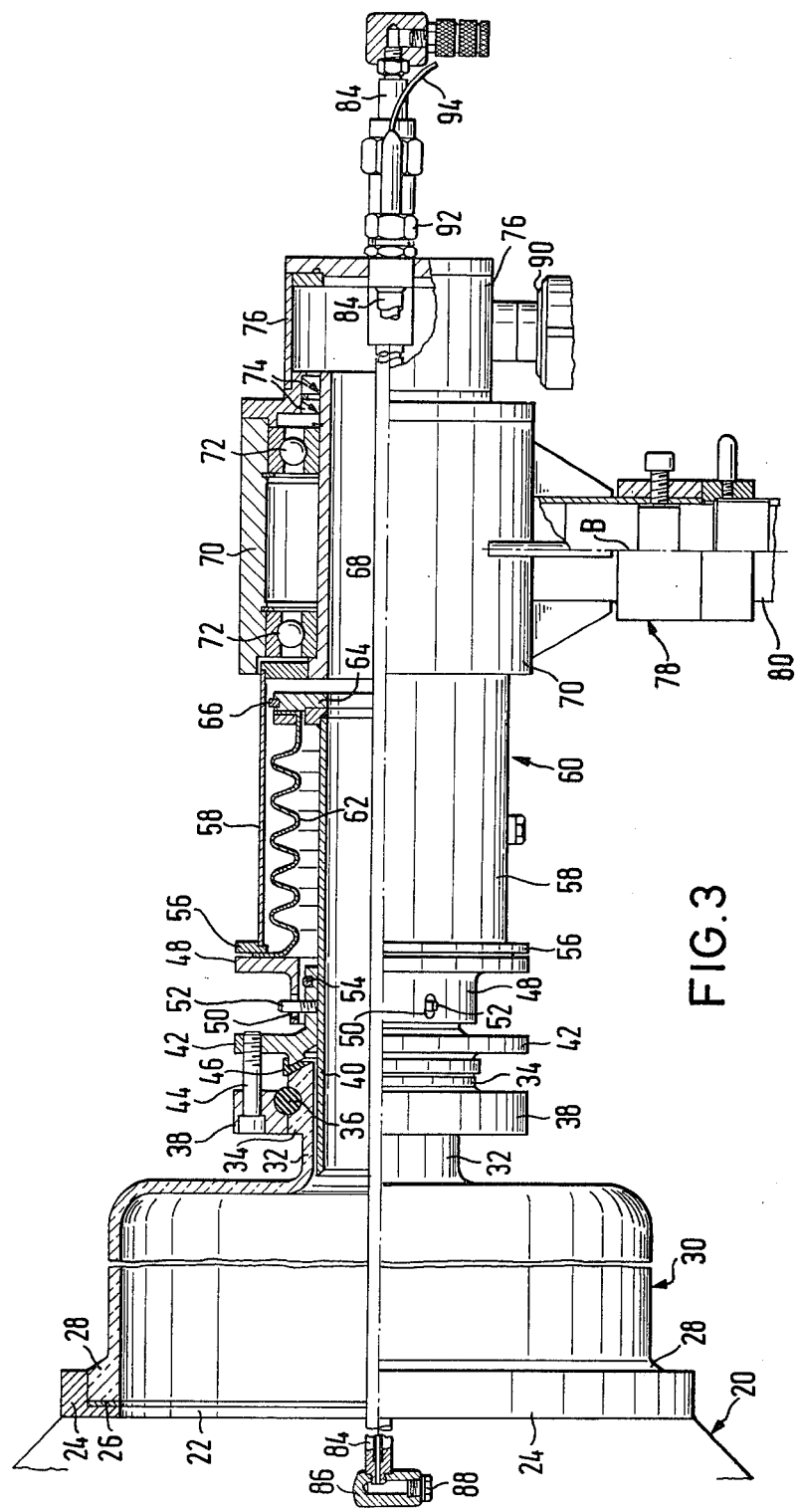
FIG. 3 is a view taken along the line III—III of FIG. 1 of a portion of the coating apparatus on an enlarged scale and partly in vertical section.

With reference to FIGS. 1 and 2, a coating apparatus includes a baseplate 10 on which a box-shaped frame 12 is fixedly secured. A plurality of bearings 14 supports a drive shaft 16 and is arranged within the frame 12. A first end of the drive shaft 16 is connected with a geared engine (not shown) disposed within the frame 12 and a second end of the shaft 16 includes a flange 18 projecting from the frame 12 (at the right hand side, as seen in FIG. 2). A coating vessel 20 is secured to the flange 18.

With reference to FIG. 3, the coating vessel 20 is build symmetrically with respect to its axis of rotation A and includes a discharge opening 22 defined by a rimmed ring 24 at a side of the coating vessel 20 remote from the flange 18. The rimmed ring 24 contains a sealing 26 and centers a marginal bead 28 which is secured to a bell-shaped cover 30.

In the illustrated embodiment, the cover 30 is made of glass and has a neck 32 formed with an annular bead 34. An annular groove of semicircular cross section is formed in the outside of the annular bead 34 and receives an O-ring 36 preferably made of rubber. The annular bead 34 is surrounded by a clamp ring 38 extending over the O-ring 36.

A tube 40 is disposed coaxially with the coating vessel 20 and rotates together with both the vessel 20 and the cover 30. The tube 40 extends with a radial clearance inside the neck 32. Axially outside of the neck 32 an intermediate flange 42 is secured, e.g. by welding, to the tube 40 and clamped together with the clamp ring 38 by screws 44. A rimmed seal 46 is clamped between the annular bead 34 and the intermediate flange 42.

A tie ring 48 is arranged coaxially with the intermediate flange 42 and is separated from the intermediate flange 48 by radial and axial clearances. The tie ring 48 includes oblong holes 50 extending parallel to the axis of the ring and offset with respect to each other in a circumferential direction. Threaded pins 52 screwed into the intermediate flange 42 extend through the oblong holes 50 and force the tie ring 48 to rotate together with the intermediate flange 42 and thus together with the coating vessel 20. Relative axial displacement of the tube 40, however, is possible within certain limits defined by the length of the oblong holes 50. During such an axial displacement, the tie ring 48 is supported on a slide ring 54 disposed on the intermediate flange 42.

The tie ring 48 is joined, e.g. by a screw connection (not shown), with an end flange 56 secured, e.g. by welding, on an outer portion 58 of a short piece of pipe 60. A bellows 62 is clamped at one end between the tie ring 48 and the end flange 56, while the other end of the bellows 62 is fixed to an end flange 64 which is preferably screw connected with the tube 40. The end flange 64 carries a slide ring 66 upon which the outer portion 58 of the piece of pipe 60 is supported during relative axial displacement of the tube 40.

The piece of pipe 60 is generally bell-shaped and has an inner portion 68, which is joined to the outer portion 58, rotatably supported in a bearing box 70 by ball bearings 72 and sealed from the space within a bearing cap 76 by shaft packings 74. Thus the space inside the coating vessel 20, the cover 30, tube 40, and the piece of pipe 60 constitutes a continuous cavity that is sealed from the outside when the coating apparatus is in the operating position as shown.

An upper rocking bearing 78 having a vertical pivot axis B supports the bearing box 70 on a strut 80 (FIG. 2) which is supported in a lower rocking bearing 82 for pivotal movement about a pivot axis C which is spaced from and parallel to the pivot axis B.

With further reference to FIG. 3, a jet tube 84 is secured to the bearing cap 76 and extends parallel to the axis of rotation A of the coating vessel through the piece of pipe 60, the tube 40, and the cover 30 into the coating vessel 20 where the jet tube 84 terminates in a nozzle holder 86 into which a spray nozzle 88 is screwed. The bearing cap 76 further comprises a vacuum connection 90 which is adapted to be connected to a means (not shown) for evacuating the coating vessel 20 and for condensing and, if desired, recovering solvents which are evaporated in the coating vessel. The bearing cap 76 also includes a hose connection 92 to which a hose 94 is connected which leads to a means (not shown) for monitoring the vacuum in the coating vessel 20.

When the bearing box 70 is pivoted about pivot axes B and C, the cover 30 is moved away from the coating vessel 20 for charging and discharging of the coating vessel 20. However, when the cover 30 is in the position shown in which the marginal bead 28 abuts against the seal 26, tight closing of the coating vessel 20 can be obtained by a slight vacuum which urges the cover 30 against the coating vessel 20. The necessary movement of the cover 30 in the direction of the axis of rotation A is accomplished since the tube 40 is axially displaceable within the piece of pipe 60. Thus it is not necessary first to overcome the axial resistance of the rocking bearings 78 and 82 when applying the suction to the cover 30. As soon as the coating vessel 20 is caused to rotate, the cover 30 rotates together with the coating vessel and transmits the rotation through the tube 40 and the threaded pins 52 to the piece of pipe 60 so that the bellows 62 is not subjected to torsional stress.

The arrangement of the jet tube 84 and vacuum connection 90 at the end of the coating vessel 20 remote from the drive shaft 16 and also the fact that the jet tube 84 and the vacuum connection 90 do not communicate with the coating vessel through the drive shaft 16 permits the drive shaft which is a hollow shaft to be used for supplying and discharging a heating or cooling fluid. The fluid flows through a jacket 96 (FIG. 2) disposed around the coating vessel and is supplied by and returns to a heating and/or cooling unit (not shown) through a connection 98 supported by the drive shaft.

The apparatus described is particularly suited for sugarcoating tablets for pharmaceutical purposes.

The principles and preferred embodiment of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the invention. Accordingly, it is expressly intended that all such variations and changes which fall within the spirit and the scope of the present invention as defined in the appended claims be embraced thereby.

What is claimed is:

1. A coating apparatus, comprising a coating vessel supported at one end, said coating vessel being adapted to be driven in rotation and being connected to a vacuum source by a coaxially arranged and co-rotatable tube at an unsupported end of the coating vessel, a spray nozzle being disposed at one end of a liquid conduit for spraying liquid into said coating vessel, said coating vessel including a discharge opening which is closable by a cover at the unsupported end of the coating vessel, the rotatable tube carrying the cover and being supported separately from the coating vessel and being guided for movement along the axis of rotation of the coating vessel.

2. The coating apparatus according to claim 1, wherein the rotatable tube is guided for axial movement within a piece of pipe which is rotatably supported by and sealed in a bearing box which is pivotable away from the coating vessel.

3. The coating apparatus according to claim 2, wherein the rotatable tube and the piece of pipe are sealed to one another by a bellows.

4. The coating apparatus according to claim 2, wherein the bearing box is supported on a strut for pivotable movement about a first pivot axis which intersects the axis of rotation of the coating vessel, said strut being pivotable about a second pivot axis which is spaced from and parallel to the first pivot axis.

5. The coating apparatus according to claim 2 or 4, wherein the liquid conduit comprises a jet tube extending through the rotatable tube into the coating vessel, the jet tube being secured to the bearing box which is pivotable away from the coating vessel.

6. The coating apparatus according to claim 1 further comprising duct means at the supported end of the coating vessel for supplying and discharging a heating or cooling fluid.

7. A coating apparatus, comprising a coating vessel supported at one end, said coating vessel being adapted to be driven in rotation and being connected to a vacuum source by a coaxially arranged and co-rotatable tube at an unsupported end of the coating vessel, said coating vessel having a spray nozzle for spraying liquid into said coating vessel, said coating vessel including a discharge opening which is closable by a cover at the unsupported end of the coating vessel.

8. The coating apparatus of claim 7 wherein the rotatable tube carries the cover and is supported separately from the coating vessel, said tube being guided for movement along the axis of rotation of the coating vessel.

* * * * *